Dec. 19, 1950 J. YOUNG, JR., ET AL 2,534,690
TUBE SUPPORT
Filed Sept. 10, 1945
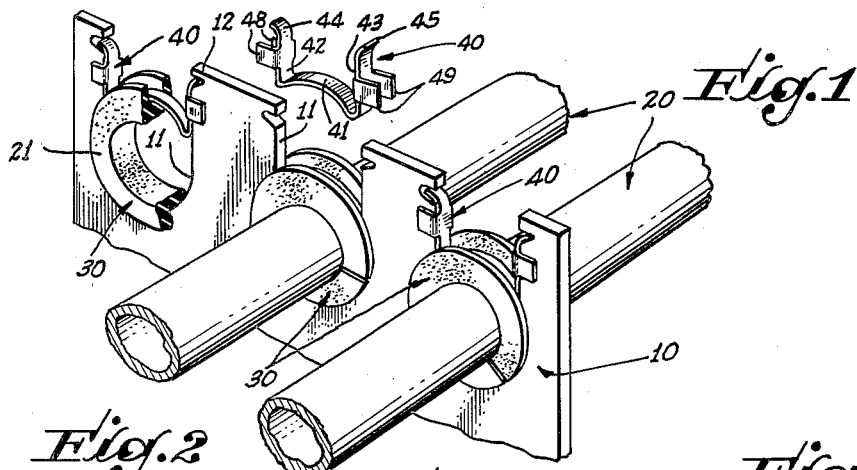
Fig.1
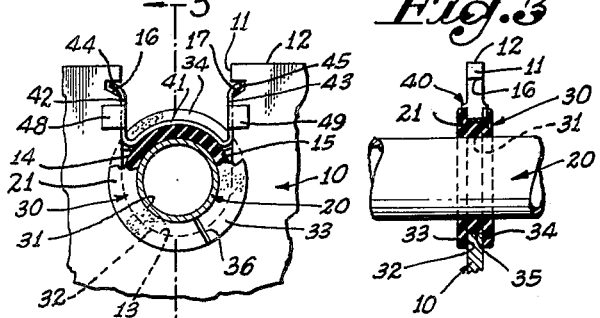
Fig.2   Fig.3   Fig.4
Fig.5   Fig.6   Fig.7
INVENTORS
JOHN YOUNG, JR.
ROBERT J. BOWER
BY
HARRIS, KIECH, FOSTER & HARRIS
FOR THE FIRM
ATTORNEYS Patented Dec. 19, 1950

2,534,690

UNITED STATES PATENT OFFICE 2,534,690

TUBE SUPPORT

John Young, Jr., South Gate, and Robert J. Bower, Los Angeles, Calif., assignors to Hughes Tool Company, Houston, Tex., a corporation of Delaware Application September 10, 1945, Serial No. 615,450

9 Claims. (Cl. 248—68)

Our invention relates to a means for mounting tenuous members such as wires, rods, tubes, etc., and a primary objective thereof is the provision of a device of this general character which is adapted for rapid and facile installation and removal while providing a positive and reliable means of support.

Efficient installation of tenuous members demands the employment of a simple and compact mounting means which is adapted to support each member individually in a dependable manner and which permits ready attachment and detachment thereof with a minimum expenditure of time, the time factor being of paramount importance if large numbers of wires or tubes are to be installed or if frequent removal thereof is dictated by the nature of the installation. Many industrial installations involve the employment of numerous tubes or pipes which must be removed for cleaning or repair at periodic intervals and such operations frequently must be accomplished in a minimum length of time to avoid the loss of revenue resulting from long periods of inoperativeness.

The hydraulic system of the conventional airplane provides an excellent illustration of these considerations, since the modern airplane incorporates a complex system of hydraulic tubes for conveying fluid to the various hydraulically-actuated movable components thereof. The conventional practice of mounting groups of parallel tubes at specified intervals by means of a pair of complementary clamping blocks necessitates simultaneous installation of all of the tubes in each group and requires the release of all tubes to effect the removal of a single tube for reparative purposes. The schedules of commercial airlines frequently cannot afford the consequent delays resulting from inordinately extended overhaul periods, and such delays are intolerable in the operation of military aircraft where the damage resulting from enemy action frequently necessitates hydraulic system repairs after every mission. These considerations are equally applicable to various other fluid-conducting installations and to electrical or communication systems where the time required to effect rapid assembly of numerous tubes or wires is an essential factor in the fabrication of such installations, since any time saved results in materially decreased manufacturing costs.

An important objective of our invention, therefore, is the achievement of a simple means for effecting individual and dependable attachment of tenuous members which is adapted to permit ready release of any member when necessary.

Another purpose of our invention is the provision of a compact mounting means adapted for retaining closely-spaced adjacent tenuous members while providing adequate accessibility to any one member without disturbing adjacent members.

A further object of our invention is to effect a realization of a device of this general character which is of light weight and which may be manufactured and assembled readily.

An additional purpose of the invention is to provide a device of this nature which insures against inadvertent disengagement and which will not be dislodged by vibrational or other stresses.

These and other objectives of our invention may be attained by means of the embodiments thereof which are described herein and a complete comprehension of our underlying inventive concept may best be achieved by referring to the accompanying drawing, which is for illustrative purposes only, wherein:

Fig. 1 is a perspective view illustrating an application of our invention to the mounting of a group of tubular members and indicating the steps involved in assembling the mounting means;

Fig. 2 is a partially sectioned end view illustrating the assembled mounting means and indicates one configuration for a resilient clamping means for retaining a tubular member.

Fig. 3 is a sectional view taken along the line 3—3 of Fig. 2;

Fig. 4 is a view similar to Fig. 2 illustrating an alternative configuration for a resilient clamping means; and Figs. 5, 6, and 7 are partially sectioned end views illustrating various alternative applications of our inventive concept to the support of a plurality of tubular members.

Referring particularly to Figs. 1 to 3, the mounting means comprises a supporting element 10 which is adapted for sustaining tenuous members 20, the latter being of tubular form for illustrative purposes only. The supporting element 10 and tubes 20 may be separated by a resilient or cushioning means 30, if desired, the tubes 20 being retained by means of resilient retaining or clamping devices 40 which are adapted for engagement with the supporting element 10 and cushioning means 30, or with the tubes 20 if the cushioning means 30 are not incorporated in the mounting means.

The supporting element 10 is preferably formed of a relatively thin plate of any suitable material and may be attached to a supporting structure (not shown) by any appropriate means, as is well known in the art. The supporting element 10 is provided with one or more recesses 11 extending inwardly from an edge 12 thereof, each recess 11 defining a base section or wall 13, which preferably conforms to the configuration of the tube 20, and defining a pair of side walls 14 and 15, each of the latter being provided with a notch 16 or 17 therein which is preferably inwardly-convergent as illustrated. The drawing illustrates a recess 11 having a semi-circular base wall 13 and mutually parallel side walls 14 and 15 which are tangent to the base wall 13. It will be understood that the base wall 13 need not be semi-circular and the side walls 14 and 15 need not be parallel nor need the distance between them be equal to the diameter of the base wall 13, as illustrated, so long as the side walls 14 and 15 are sufficiently removed from each other to permit lateral insertion of the tube 20 therebetween during assembly of the mounting means, as will be described in detail hereinafter.

The cushioning means 30 is preferably a split annular grommet 21 formed of rubber, neoprene, or the like, for mechanical applications of the invention to prevent direct contact between the tube 20 and supporting element 10 and to dampen any vibration of the latter which may be transmitted to the tube 20, or the cushioning means 30 may be formed of any suitable non-conductive or insulating material for electrical applications. The grommet 21 is provided with an opening 31 therethrough which is adapted for peripheral engagement with the tube 20 and has an annular groove 32 in the outer periphery thereof to define a pair of spaced flanges 33 and 34 which are adapted for engagement with the supporting element 10, as best shown in Fig. 3. The diameter subtended by the base 35 of the groove 32 is preferably equal to or slightly larger than the diameter of the base wall 13 of the recess 11 to insure a close fit, and diameters of the flanges 33 and 34 should be sufficiently large to insure positive engagement with the supporting element 10. The grommet 21 is preferably provided with a radial slit 36 therein to facilitate its insertion into the space between the tube 20 and the base wall 13 of the recess 11. When assembling the mounting means with the tube 20 disposed in the recess 11, the grommet 21 is preferably partially straightened and inserted peripherally (parallel to the periphery of the tube 20) rather than longitudinally (parallel to the longitudinal axis of the tube 20) since peripheral insertion permits employment of larger diameters for the flanges 33 and 34. Providing for longitudinal insertion would necessitate using smaller flange diameters to permit forcing one flange 33 or 34 through the space between the tube 20 and walls 13, 14, and 15. When the distance between the side walls 14 and 15 of the recess 11 is equal to the diameter of the semi-circular base wall 13 as illustrated, the grommet 21 may be placed over the tube 20 and both may then be inserted laterally into the recess 11.

The resilient retaining or clamping device 40 is illustrated as a spring clamp and is formed by bending a strip of any suitable flexible and resilient metal intermediate the ends thereof to define an arcuate base segment 41 which is adapted for engagement with the base 35 of the groove 32 in the grommet 21, or with the periphery of the tube 20 if no grommet 21 is used. A pair of laterally-extending arms 42 and 43 may be formed integrally with the base segment 41, each of the arms 42 and 43 having a portion thereof bent outwardly to form projecting segments 44 and 45 which are adapted for insertion into and engagement with the notches 16 and 17, the taper of the notches 16 and 17 serving to facilitate insertion of the segments 44 and 45 thereinto. The segments 44 and 45 may be formed by the outwardly-deformed free ends of the arms 42 and 43, or by outwardly-deformed sections 44 and 45 intermediate the ends thereof, as illustrated in Fig. 4, the latter embodiment being perhaps more suitable for facilitating removal of the clamp 40 from the recess 11 because of the greater accessibility thereto offered by providing for termination of the arms 42 and 43 in unenclosed free ends 46 and 47. Each of the arms 42 and 43 is preferably provided with tabs extending therefrom which are bent outwardly to form flanges 48 and 49 adapted for engagement with the supporting element 10 adjacent the side walls 14 and 15 of the recess 11 to prevent dislodging the clamp 40 by a longitudinal force applied thereto. Installation of the clamp 40 may be effected readily by urging the arms 42 and 43 together manually or by other suitable means and inserting the clamp 40 into the recess 11 until the base segment 41 engages the grommet 21 or tube 20 and the projecting segments 44 and 45 enter the notches 16 and 17. The restoring force offered by the resilience of the base segment 41 and arms 42 and 43 will retain the projecting segments 44 and 45 within the notches 16 and 17, and the clamp 40 will retain the tube 20 and/or the grommet 21 within the recess 11 in a positive and reliable manner, the flanges 48 and 49 serving to assist in guaranteeing the permanence of the installation. The spring clamp 40 may be removed readily by simply reversing the insertion process described above.

The foregoing discussion may also be applied to the alternative embodiments of our invention, illustrated in Figs. 5 to 7, which are adapted to mount several tubes 20 in a single recess 11 of suitable depth. Two of the grommets 21 previously described may be supplemented by a suitable spacer 37 which is complementary thereto, as illustrated in Fig. 5, or each grommet 21 may be truncated to the base of the groove 32 to provide mutually complementary contiguous plane surfaces 38, as shown in Fig. 6. The embodiment illustrated in Fig. 7 provides semi-circular grommets 50 having linear sides 59 which terminate in mutually complementary plane surfaces 58, each grommet 50 having an opening 51 therethrough to encircle the tube 20 and having a groove 52 in the outer surface thereof to define flanges 53 and 54 which are adapted for engagement with the supporting element 10 in the manner previously discussed. The grommet 50 is also preferably provided with a radial slit 56 therein to permit ready insertion of the tube 20 into the opening 51.

Our invention thus provides a simple means for effecting positive retention and support of tenuous members in a reliable manner, and is well adapted for achieving rapid and facile installation and removal of the members. The invention permits individual support when this is required by the nature of the installation and provides a novel and efficient means for effecting plural support when independent retention is not an essential consideration. The mounting means is light and compact and thus permits extremely close spacing of the adjacent tenuous members, and the simplicity of the installation permits easy and inexpensive fabrication and assembly thereof.

Having herein described various specific embodiments of our invention and having suggested several applications thereof, the present disclosure will suggest to those skilled in the art various changes, modifications, and substitutions which are contemplated by our underlying inventive concept; we do not intend, therefore, to be limited to the specific disclosures contained herein and hereby reserve the right to all such changes, modifications, and substitutions that properly come within the scope of our appended claims.

We claim as our invention:

1. In a device for mounting a tenuous member in a relatively rigid supporting element providing a recess adapted for the reception of the tenuous member and having a base section and a pair of side walls extending to the edge of said supporting element, one of said side walls having a notch therein, a relatively resilient clamping means comprising: a base segment traversing said recess; an arm extending from said base segment and lying along said notched side wall; and means carried by said arm and adapted to extend into said notch for retaining said base segment in position.

2. In a device for mounting a tenuous member in a supporting element providing a recess adapted for the reception of the tenuous member and having a base section and a pair of side walls extending to the edge of said supporting element, each of said side walls having a notch therein, a clamping means comprising: a base segment traversing said recess; a pair of arms extending from said base segment toward said edge between said side walls; and means carried by said arms and extending in locking relationship with said notches.

3. In a device for mounting adjacent tenuous members, the combination of: a relatively rigid supporting element provided with a recess extending inwardly from an edge thereof and of a sufficient depth to receive said adjacent tenuous members in side-by-side relationship, said recess providing a pair of side walls; and clamping means extensible in said recess to retain said tenuous members therein, said clamping means including means engageable with at least one of said side walls for retaining said clamping means in position.

4. A combination as defined in claim 3, including a resilient ring surrounding each of said tenuous members to retain same in said recess in spaced relationship with said supporting element, the rings around adjacent tenuous members being in contact with each other, and the ring around that tenuous member closest to said edge being engaged by said clamping means.

5. As an article of manufacture for securing a tenuous member in a recess of a supporting element, said recess providing a pair of side walls, a retaining member comprising a strip of flexible material deformed into a general U shape to provide a base segment and a pair of laterally-extending arms, said arms being spaced to extend between said side walls, at least one of said arms providing outwardly-extending flanges spaced to extend on opposite sides of said supporting element.

6. As an article of manufacture for securing a tenuous member in a recess of a supporting element, said recess providing a pair of side walls, a retaining member comprising a strip of flexible material deformed intermediate its ends to provide a base segment and a pair of laterally-extending arms spaced to be disposed between said side walls, each arm providing a locking portion engageable with one of said side walls, at least one arm providing a pair of flanges spaced to receive said supporting element.

7. In a device for mounting a tenuous member, the combination of: a relatively rigid supporting element having a recess formed therein to receive said tenuous member, said recess extending from the edge of said element to permit the lateral insertion of said member therein, and having a base portion and a pair of walls extending from said base portion to said edge, one of said walls having a notch formed therein, spaced from said base portion; and a resilient holding means adapted to fit within said recess, said means comprising a base section adapted to extend across said recess to prevent the removal of said tenuous member therefrom, and a pair of arms extending outwardly from the ends of said base section along the walls of said recess, one of said arms having a projection thereon adapted to fit within said notch to retain said holding means within said recess, at least one of said arms having means to engage opposite sides of said supporting element to hold said means in position.

8. In a device for mounting a tenuous member, the combination of: a supporting element provided with a recess adapted for the reception of said tenuous member and extending inward from an edge thereof, said recess providing a base section of a size larger than said tenuous member, and a pair of side walls extending inwardly from said edge and spaced a sufficient distance to pass said tenuous member; resilient means between said base section and said tenuous member; and clamping means extensible into said recess and comprising a flexible base segment adapted for engagement with said resilient means, and a pair of spaced flexible arms extending laterally from said base segment along said side walls, said arms carrying locking means engageable with said side walls for retaining said tenuous member in position.

9. In a device for mounting a tenuous member in a thin sheet-like supporting element whose plane is substantially perpendicular to the axis of said member, provided with a recess therein adapted for the reception of the tenuous member, a clamping means comprising: a base segment traversing said recess; an arm extending from said base segment, lying along the wall of said recess and engaging the opposite sides of said sheet-like supporting element; and locking means on said arm engaging the wall of said recess.

JOHN YOUNG, Jr.
ROBERT J. BOWER.

REFERENCES CITED

The following references are of record in the file of this patent:

UNITED STATES PATENTS

| Number | Name | Date |
|---|---|---|
| 229,403 | Haff | June 29, 1880 |
| 1,668,953 | Erickson | May 8, 1928 |
| 1,804,416 | Hathaway | May 12, 1931 |
| 1,919,319 | Church | July 25, 1933 |
| 2,215,283 | Adler | Sept. 17, 1940 |
| 2,223,273 | Slessman | Nov. 26, 1940 |
| 2,338,660 | Morehouse | Jan. 4, 1944 |
| 2,342,958 | Morehouse | Feb. 29, 1944 |

FOREIGN PATENTS

| Number | Country | Date |
|---|---|---|
| 7,239 | Great Britain | of 1885 |
| 6,884 | Great Britain | of 1901 |
| 736,735 | France | Sept. 26, 1932 |
| 120,913 | Switzerland | July 1, 1927 |